US008568667B2

(12) United States Patent
Lind et al.

(10) Patent No.: US 8,568,667 B2
(45) Date of Patent: Oct. 29, 2013

(54) HANDLE PIPETTE

(75) Inventors: Mikael Lind, Helsinki (FI); Jouko Mikkonen, Helsinki (FI); Mauno Heinonen, Vantaa (FI); Juha Telimaa, Järvenpää (FI)

(73) Assignee: Thermo Fisher Scientific Oy, Vantaa (FI)

( * ) Notice: Subject to any disclaimer, the term of this patent is extended or adjusted under 35 U.S.C. 154(b) by 0 days.

(21) Appl. No.: 13/292,387

(22) Filed: Nov. 9, 2011

(65) Prior Publication Data

US 2012/0198947 A1 Aug. 9, 2012

(30) Foreign Application Priority Data

Nov. 11, 2010 (FI) ..................................... 20106184

(51) Int. Cl.
*B01L 3/00* (2006.01)
*G01F 19/00* (2006.01)

(52) U.S. Cl.
USPC ........................................... 422/501; 73/1.74

(58) Field of Classification Search
USPC ........................................... 422/501; 73/1.74
See application file for complete search history.

(56) References Cited

U.S. PATENT DOCUMENTS 3,827,305 A 8/1974 Gilson et al.
3,834,240 A * 9/1974 Kenney ...................... 73/864.15
4,098,276 A * 7/1978 Bloom et al. ................. 604/186
4,581,021 A * 4/1986 Landau et al. ................ 604/212
4,923,096 A * 5/1990 Ennis, III ...................... 222/391
4,968,303 A * 11/1990 Clarke et al. .................. 604/187
5,770,159 A * 6/1998 Marteau D'Autry ......... 422/515
5,988,457 A * 11/1999 Andrew et al. ............ 222/475.1
6,024,728 A * 2/2000 Schulz .......................... 604/224
6,240,791 B1 * 6/2001 Kenney ...................... 73/864.14
7,204,163 B2 4/2007 Uldry et al.
7,416,704 B2 8/2008 Scordato et al.
2002/0012613 A1 * 1/2002 Scordato et al. .............. 422/100
2009/0010809 A1 * 1/2009 Hadjis et al. .................. 422/100
2009/0071266 A1 3/2009 Nelson et al.
2009/0093787 A1 * 4/2009 Barbour ........................ 604/506
2009/0227894 A1 * 9/2009 Fojtik ............................ 600/566
2011/0182010 A1 * 7/2011 Schouten ................. 361/679.01

FOREIGN PATENT DOCUMENTS

DE 103 22 259 12/2004

OTHER PUBLICATIONS

Search Report for FI 20106184, dated Jun. 21, 2011.

* cited by examiner

*Primary Examiner* — Jill Warden
*Assistant Examiner* — Brittany Fisher
(74) *Attorney, Agent, or Firm* — Nixon & Vanderhye P.C.

(57) ABSTRACT

A handle pipette including at least one cylinder with an upper end and a lower end, said cylinder having a movable piston, an elongate handle (1), by which the pipette can be manually gripped, said handle having an upper part, and in the upper part of the handle, a sideways extending finger support (7), which finger support (7) is at least partly flexible and/or it can be shaped by the user.

5 Claims, 1 Drawing Sheet

HANDLE PIPETTE

This application claims priority to FI Patent Application No. 20106184 filed 11 Nov. 2010, the entire contents of which is hereby incorporated by reference.

FIELD OF INVENTION

The invention relates to the dispensing of liquids and to a pipette provided with an elongate handle, the upper part of said handle including a sideways protruding finger support.

PRIOR ART

For dispensing liquids, there are used pipettes with a piston, by means of which liquid is absorbed in a pipette tip to be attached to a suction channel, and removed from said pipette tip. The pipette is provided with an elongate handle, by which the pipette can be gripped with a palm grip. The upper part of the handle is provided with a sideways extending finger support, offering a rest for the index finger, that improves the manual grip of the pipette. At the outer end, the finger support is slightly downwardly curved. Attempts for improving the tactile properties of pipettes have been realized by improving the handle design. From the Finnish patent application publication FI 20012251, there also is known a pipette with a handle part that can be shaped by the user and even replaced with another one.

GENERAL DESCRIPTION OF INVENTION

An invention according to the appended claims has now been made.

The pipette according to the invention is provided with a finger support that is elastic and can be shaped by the user. Thus the user may shape the finger rest to be optimally suitable for him/her, which means an improvement in the ergonomics.

According to one embodiment, the finger support is at least partly made of an elastic material. In that case the pipette may include a rigid support element attached to the body, and as an extension of said rigid support element, a flexible support element. In the operational position, the flexible support element is positioned substantially in the lengthwise direction of the handle. It extends from the upper end of the handle preferably to the distance of at least one third of the handle length.

According to one embodiment, the finger support includes a detachable, elastic part.

According to one embodiment, the finger support is provided with a pivoted tip part and a spring that presses the tip part towards the handle.

The pipette may also include a lower support formed at the lower edge of the handle, said lower support extending radially outwards from the handle surface, at least along part of the lower edge of the handle.

DRAWINGS

The appended drawings belong to the written specification of the invention, and constitute an inseparable part of the detailed description of a few preferred embodiments of the invention, to be given below. In the drawings.

DETAILED DESCRIPTION OF PREFERRED EMBODIMENTS

Figure 1:
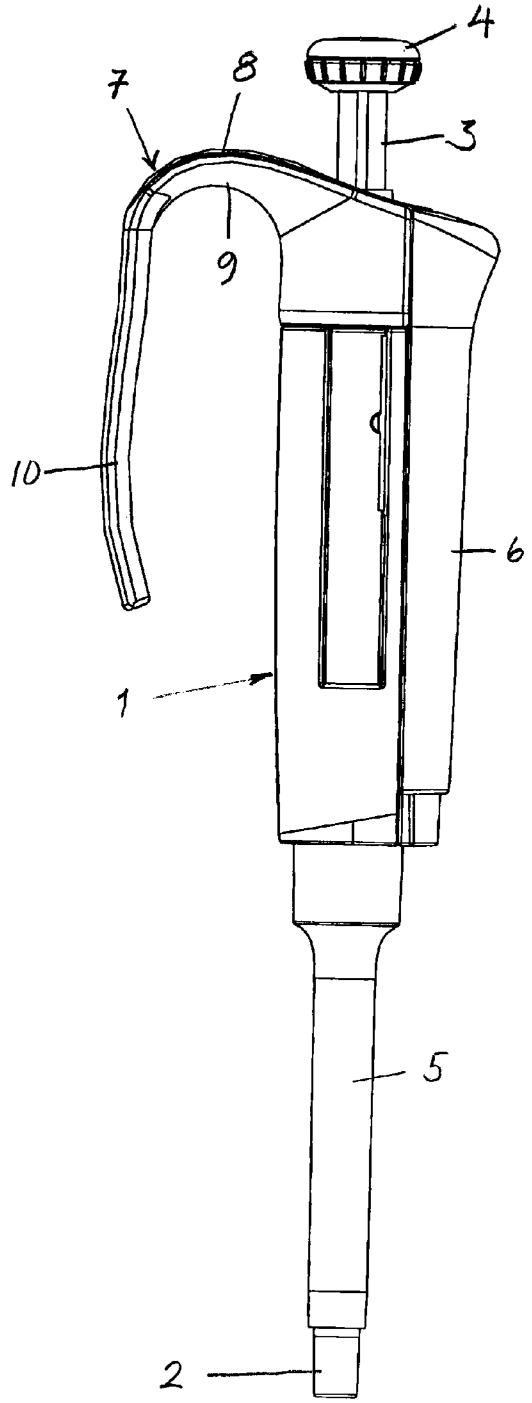
FIG. 1 is a side-view illustration of the whole pipette.
Figure 2:
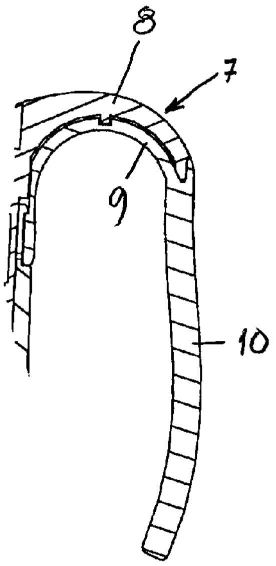
FIG. 2 is a cross-sectional illustration of the finger support of the pipette.
Figure 3:
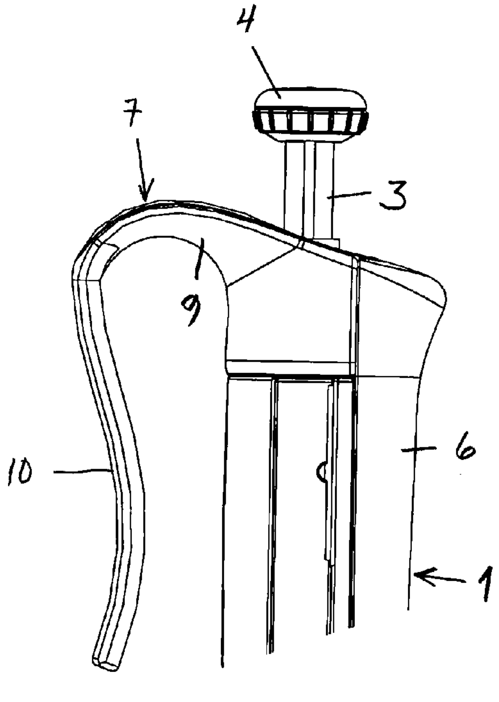
FIG. 3 illustrates the upper part of the pipette, with the finger support shaped in a different position.

The pipette according to the drawings includes a cylinder and a movable piston provided therein. These are fitted in an elongate body formed by a handle 1 and a tip part 2 placed at the lower end of the handle. At the end of the tip part, there is attached a pipette tip in which the liquid to be dispensed is sucked. As an extension of the piston, there is arranged a shaft 3 that is projected out of a hole provided at the upper end of the handle. The end of the shaft includes a button 4.

Pipettes include a volume adjustment mechanism where the dispensing volume is set by turning the shaft 3 at the button 4. The set volume can be presented for example by means of numeral rings in a window arranged in the handle. This kind of mechanism is described for example in the publication WO 2005/050554. The button is preferably of a type having in the lengthwise direction of the shaft a lower position where the shaft is not rotated along with the button, and an upper position where the shaft is rotated along with the button. This is a way to try and prevent any accidental change in the volume settings. This kind of mechanism is described for example in the publication WO 2009/118456.

On top of the tip part 2, there is arranged a tip ejector sleeve 5. As an extension of the top part of said sleeve 5, at the side of the handle 1, there is arranged a spring loaded press button 6, which can be pressed down against the spring force, so that the sleeve pushes the pipette tip placed at the end of the tip part, thus detaching it. The force needed for detaching can be reduced by a lever mechanism, for example by means of a wheel moving in between the press button and the handle. This kind of mechanism is described for example in the publication EP 556939.

At the upper end of the handle 1, on the side opposite to the tip ejector button 6, there is arranged a finger support 7. It includes a rigid body part 8 on the upper side, and beneath it a softer contact part 9 facing the finger. The contact part is extended as a flexible support 10, substantially in the lengthwise direction of the handle. The flexible support extends to beneath the halfway of the handle. The contact part is made of an elastic material. Thus the user can shape the contact part in a shape that best conforms to his/her hand.

At the lower end of the handle 1, i.e. at the opposite end of the handle when viewed from the finger support 7, there can be formed a lower support, which can be for instance a bracket protruding outwardly from the handle surface. In shape, the lower support can also be an upwardly curved protrusion, in which case the shape of the lower support corresponds to the inverted shape of the finger support 7. The lower support can extend radially with respect to the pipette center axis only on part of the cross-sectional plane of the pipette, or alternatively it can extend radially along the whole area of the lower edge of the handle 1, or in the cross-sectional plane of the whole pipette.

The flexible support 10 of the finger support 9 can also be attached to the finger support in a pivoted fashion, in which case the pivoting is advantageously realized for example with spring force, so that the spring force presses the flexible support towards the user's fingers. In this embodiment, the flexible support 10 is advantageously attached in a pivoted fashion to the outermost end or tip of the finger support 9.

The invention claimed is:

1. A handle pipette comprising:

an elongate body having upper and lower parts, at least one cylinder disposed within the elongate body and including an upper end and a lower end, a movable piston positioned within the cylinder for movements between the upper ends and lower ends thereof, an elongate handle forming a part of elongate between the upper and lower parts of the elongate body so as to at least partially surround the at least one cylinder disposed therewithin, wherein the elongate handle allows the pipette to be manually gripped by a user's fingers, and a finger support extending sideways from the upper part of the elongate body, wherein the finger support includes a flexible support, and a rigid body part attached to the handle, wherein the flexible support is attached pivotally to the finger support and extends longitudinally from the rigid support, parallel to the longitudinal axis of the cylinder, in order to create a spring force that presses the flexible support to the finger support toward the user's fingers.

2. A pipette according to claim 1, where the finger support is at least partly made of a material which is shapeable by a user.

3. A pipette according to claim 1, wherein during operation of the pipette by the user, the flexible support element is positioned substantially in a lengthwise direction of the elongate handle.

4. A pipette according to claim 3, wherein during operation of the pipette by the user, the flexible support extends from the upper end of the handle for at least one third of a length of the handle.

5. A pipette according to claim 1, which further comprises a lower support extending from a lower edge of the handle.

* * * * *